(12) United States Patent
Hughes et al.

(10) Patent No.: US 9,963,586 B2
(45) Date of Patent: May 8, 2018

(54) PREPREG, FIBER REINFORCED COMPOSITE MATERIAL, AND MANUFACTURING METHOD FOR FIBER REINFORCED COMPOSITE MATERIAL

(71) Applicant: TORAY INDUSTRIES, INC., Chuo-ku (JP)

(72) Inventors: Jonathan C Hughes, Auburn, WA (US); Jeffrey A Satterwhite, Puyallup, WA (US); Nobuyuki Arai, Ehime (JP); Atsuhito Arai, Ehime (JP); Alfred P Haro, Spanaway, WA (US); Kenichi Yoshioka, Puyallup, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 199 days.

(21) Appl. No.: 14/367,267

(22) PCT Filed: Dec. 26, 2012

(86) PCT No.: PCT/US2012/071641
§ 371 (c)(1),
(2) Date: Jun. 20, 2014

(87) PCT Pub. No.: WO2013/096968
PCT Pub. Date: Jun. 27, 2013

(65) Prior Publication Data
US 2014/0309336 A1 Oct. 16, 2014

Related U.S. Application Data

(60) Provisional application No. 61/579,889, filed on Dec. 23, 2011, provisional application No. 61/710,032, filed on Oct. 5, 2012.

(51) Int. Cl.
*C08L 63/00* (2006.01)
*B29C 70/44* (2006.01)
(Continued)

(52) U.S. Cl.
CPC ............ *C08L 63/00* (2013.01); *B29C 43/12* (2013.01); *B29C 70/44* (2013.01); *B32B 5/02* (2013.01);
(Continued)

(58) Field of Classification Search
CPC ...................................................... C08L 63/00
See application file for complete search history.

(56) References Cited

U.S. PATENT DOCUMENTS

| 6,752,190 B1 * | 6/2004 | Boll ................... B29B 15/08 156/173 |
| 7,935,200 B1 * | 5/2011 | Keller ................. B29C 70/44 156/64 |

(Continued)

OTHER PUBLICATIONS

Harruf et al. "Composite Curing Process Nondestructive Evaluation," Materials Laboratory, Airforce Wright Aeronautical Laboratories, McDonnel Doubis Corporation, AFWAL-TR-88-405, Aug. 22, 1988.*

(Continued)

*Primary Examiner* — Megan McCulley
(74) *Attorney, Agent, or Firm* — Pillsbury Winthrop Shaw Pittman LLP

(57) ABSTRACT

Embodiments herein relate to a prepreg comprising a thermosetting resin, and reinforcing fibers in the thermosetting resin, wherein when the prepreg is cured in vacuum bag only conditions, and a method of making the same. The method also applies for autoclave processing. Embodiments also relate to a cured fiber reinforced composite material made by thermally curing the prepreg.

2 Claims, 2 Drawing Sheets

Explanation of reference
1 : Reinforcing fiber
2 : Thermosetting resin
3 : Reinforcing fiber layer (Intralayer)
4 : Thermoplastic resin particle
5 : Interlayer molded layer (Interlayer)
6 : Unimpregnated layer

(51) Int. Cl.
<table>
<tr><td>B29C 43/12</td><td>(2006.01)</td></tr>
<tr><td>B32B 5/22</td><td>(2006.01)</td></tr>
<tr><td>C08J 5/24</td><td>(2006.01)</td></tr>
<tr><td>B32B 5/02</td><td>(2006.01)</td></tr>
<tr><td>B32B 5/16</td><td>(2006.01)</td></tr>
<tr><td>B32B 5/26</td><td>(2006.01)</td></tr>
<tr><td>B32B 5/30</td><td>(2006.01)</td></tr>
<tr><td>C08J 3/24</td><td>(2006.01)</td></tr>
<tr><td>B29K 101/10</td><td>(2006.01)</td></tr>
</table>

(52) U.S. Cl.
CPC ............... *B32B 5/16* (2013.01); *B32B 5/22* (2013.01); *B32B 5/26* (2013.01); *B32B 5/30* (2013.01); *C08J 3/248* (2013.01); *C08J 5/24* (2013.01); *B29K 2101/10* (2013.01); *B32B 2260/021* (2013.01); *B32B 2260/025* (2013.01); *B32B 2260/046* (2013.01); *B32B 2262/02* (2013.01); *B32B 2262/0261* (2013.01); *B32B 2262/0269* (2013.01); *B32B 2262/10* (2013.01); *B32B 2262/101* (2013.01); *B32B 2262/106* (2013.01); *B32B 2264/02* (2013.01); *B32B 2307/306* (2013.01); *B32B 2307/50* (2013.01); *B32B 2307/558* (2013.01); *B32B 2307/718* (2013.01); *B32B 2457/00* (2013.01); *B32B 2605/00* (2013.01)

(56) References Cited

U.S. PATENT DOCUMENTS

| | | | | |
|---|---|---|---|---|
| 2002/0007022 A1* | 1/2002 | Oosedo | ................ | C08G 59/40 525/527 |
| 2002/0053465 A1* | 5/2002 | Kawakita | ............. | H05K 3/4069 174/256 |
| 2002/0056782 A1* | 5/2002 | Gabrys | ................ | B29C 53/8016 242/437.3 |
| 2002/0121334 A1* | 9/2002 | Ikeda | ........................ | B32B 5/18 156/246 |
| 2003/0003287 A1* | 1/2003 | Tobita | ....................... | C08J 5/046 428/297.4 |
| 2003/0065109 A1* | 4/2003 | Akatsuka | .............. | C07D 301/26 525/523 |
| 2003/0135011 A1* | 7/2003 | Goto | ....................... | C08G 59/18 528/93 |
| 2005/0253309 A1* | 11/2005 | Hou | ......................... | B29C 35/02 264/571 |
| 2008/0166511 A1* | 7/2008 | Honma | ................... | C08G 59/50 428/36.4 |
| 2008/0308210 A1* | 12/2008 | Keller | .................... | B29C 70/44 156/64 |
| 2010/0124659 A1* | 5/2010 | Nelson | ................ | B29C 35/0266 428/411.1 |
| 2010/0159231 A1* | 6/2010 | Cho | ......................... | C08K 7/28 428/304.4 |
| 2011/0023202 A1* | 2/2011 | Vanarsdalen | .......... | A42C 2/005 2/2.5 |
| 2011/0143856 A1 | 6/2011 | Miwa et al. | | |

OTHER PUBLICATIONS

International Preliminary Report on Patentability dated Dec. 31, 2014 in corresponding International Patent Application No. PCT/US2012/071641 (6 pages).

* cited by examiner

Explanation of reference
1 : Reinforcing fiber
2 : Thermosetting resin
3 : Reinforcing fiber layer (Intralayer)
4 : Thermoplastic resin particle
5 : Interlayer molded layer (Interlayer)
6 : Unimpregnated layer Explanation of reference
1 : Reinforcing fiber
2 : Thermosetting resin
3 : Reinforcing fiber layer (Intralayer)
4 : Thermoplastic resin particle
5 : Interlayer molded layer (Interlayer)
6 : Unimpregnated layer

PREPREG, FIBER REINFORCED COMPOSITE MATERIAL, AND MANUFACTURING METHOD FOR FIBER REINFORCED COMPOSITE MATERIAL

CROSS-REFERENCE TO RELATED APPLICATIONS

The present application is the U.S. national stage application to International Patent Application No. PCT/US2012/071641, filed Dec. 26, 2012, which claims benefit of priority to U.S. Provisional Patent Application No. 61/579,889, filed Dec. 23, 2011 and U.S. Provisional Patent Application No. 61/710,032, filed Oct. 5, 2012, which are incorporated by reference herein in their entireties.

FIELD OF THE INVENTION

A prepreg for manufacturing a fiber-reinforced composite material that can provide a minimum time for processing by adjusting the cure rate to allow for full consolidation during vacuum bag only processing and then cure to a certain percentage before ramping to the second dwell temperature to reduce void growth from volatiles in the prepreg. This process also applies for autoclave processing.

BACKGROUND

Fiber reinforced composite (FRC) materials have excellent mechanical properties such as strength and rigidity while being lightweight, and therefore are widely used as aircraft members, spacecraft members, automobile members, railway car members, ship members, sports apparatus members, and computer members such as housings for laptops, and the demand is increasing year by year. Of these fields, aircraft members and spacecraft members require particularly excellent mechanical properties and heat resistance, so carbon fibers are most commonly used as the reinforcing fiber. Herein, examples of spacecraft members include members that are used in man-made satellites, rockets, and space shuttles and the like.

FRC components may be manufactured using fibers that are pre-impregnated with the matrix component, also known as prepregs. To form a composite part from the prepregs, one or more layers of prepregs are assembled within a mold and heat may be applied to cause the matrix resin to flow, enabling consolidation of the prepreg layers. The applied heat may additionally cure or polymerize the matrix components.

The consolidation of prepregs to form composites in this manner is difficult, however. Techniques have been developed to enhance removal of entrapped gases during composite fabrication, however, problems remain. Gases may be trapped from insufficient evacuation of the air before full consolidation by evacuation of the air path. Removal of these volatiles may be inhibited due to the use of the prepreg on large structures, complex geometries and layup sequences that cause parts of the prepreg to lose its connection to the outside air path. Also insufficient pressure from autoclave or vacuum bag only processing can increase the void content of the FRC components. To reduce the disassociation of these volatiles from the matrix and to decrease the growth of voids from trapped gases a reduced temperature cure can be used. This however, creates long processing times due to the slower cure time of the matrix resin at these low cure temperatures. If a matrix resin is made to cure too quickly for certain systems such as interlayer toughened systems there may not be sufficient time for the prepreg to fully consolidate.

SUMMARY OF THE INVENTION

An embodiment relates to a prepreg comprising a thermosetting resin, and reinforcing fibers in the thermosetting resin, wherein when the prepreg is cured in vacuum bag only conditions, the prepreg satisfies the following conditions (1) and (2):

$$100 \leq t_i \leq 2000 \quad (1)$$

$$t_i < t_{20} \leq 350 \quad (2)$$

wherein, $t_i = t_1 + t_2$ (in minutes), wherein $t_1$ is time (in minutes) from 20° C. to an initial dwell temperature of 120° C. and $t_2$ is time (in minutes) at 120° C. until the prepreg reaches 30% attenuation which is determined using an ultrasonic non destructive inspection (NDI), $t_{20} = t_1 + t_3$ (in minutes), wherein $t_1$ is time (in minutes) from 20° C. to an initial dwell temperature of 120° C. and $t_3$ is time (in minutes) at 120° C. until the prepreg reaches a cure degree of 20%, which is determined using differential scanning calorimeter (DSC), wherein the thermosetting resin comprises an accelerator for reducing $t_{20}$ while maintaining the time for consolidation $t_i$. Preferably, the thermosetting resin has a viscosity range of 120 poise to 300 poise at 120° C. The prepreg could further comprise thermoplastic particles localized at surfaces of the prepreg. Preferably, an impregnation ratio of the prepreg is between about 20% and about 95%. Preferably, the prepreg satisfies the following conditions (1) and (2);

$$100 \leq t_i \leq 2000$$

$$80 \leq t_{20} \leq 150$$

Preferably, the thermosetting resin comprises an accelerator for reducing $t_{20}$ while maintain the time for consolidation $t_i$. Preferably, the accelerator comprises a phenol and/or a sulfonic ester group. Preferably, the amount of the accelerator is between about 0.5 and about 10 weight parts per 100 weight parts of the thermosetting resin. Preferably, the prepreg comprises a component comprising a sulfonic acid group. Preferably, the prepreg comprises a component comprising a pyrocatechol group. Preferably, the prepreg comprises a component comprising a tosyl group. Preferably, the thermosetting resin has a Tg≥180 C when cured at 180 C for 2 hours. Preferably, the accelerator does not reduce a Tg of the thermosetting resin below 180 C when the prepreg is cured at 180 C for 2 hours.

Another embodiment relates to a method of processing a prepreg comprising a thermosetting resin, the method comprising determining the consolidation time by curing the thermosetting resin in an oven under a vacuum bag, and determining an attenuation loss of the prepreg, and recording a time when the attenuation loss reaches 30%, and determining a time at which a percent cure of the thermosetting resin reaches 20%.

Another embodiment relates to a method of processing a prepreg comprising a thermosetting resin, and reinforcing fibers in the thermosetting resin, wherein the thermosetting resin comprises an accelerator for reducing $t_{20}$ while maintain the time for consolidation $t_i$, wherein, $t_i = t_1 + t_2$ (in minutes), wherein $t_1$ is time (in minutes) from 20° C. to an initial dwell temperature of 120° C. and $t_2$ is time (in minutes) at 120° C. until the prepreg reaches 30% attenuation which is determined using an ultrasonic non destructive inspection (NDI), $t_{20}=t_1+t_3$ (in minutes), wherein $t_1$ is time (in minutes) from 20° C. to an initial dwell temperature of 120° C. and $t_3$ is time (in minutes) at 120° C. until the prepreg reaches a cure degree of 20%, which is determined using differential scanning calorimeter (DSC).

These conditions satisfy the need for the prepreg to reach full consolidation at the intermediate dwell temperature before a certain point of cure and then allow the thermosetting resin to cure to a certain point before ramping up to the final cure temperature. If the ramp to the final curer temperature is started before the cure of the thermosetting resin reaches 20% volatiles will disassociate and create voids in the FRC.

In an embodiment, the particle or fiber thermoplastic is substantially locally distributed on or near a surface of the prepreg.

In a further embodiment, a fiber reinforced composite material made by thermally curing the prepreg is also included.

Furthermore, the manufacturing method for a fiber reinforced composite material of the embodiments is such that the prepreg is laminated, and molding the prepreg using a vacuum pump and oven.

DETAILED DESCRIPTION

Figure 1:
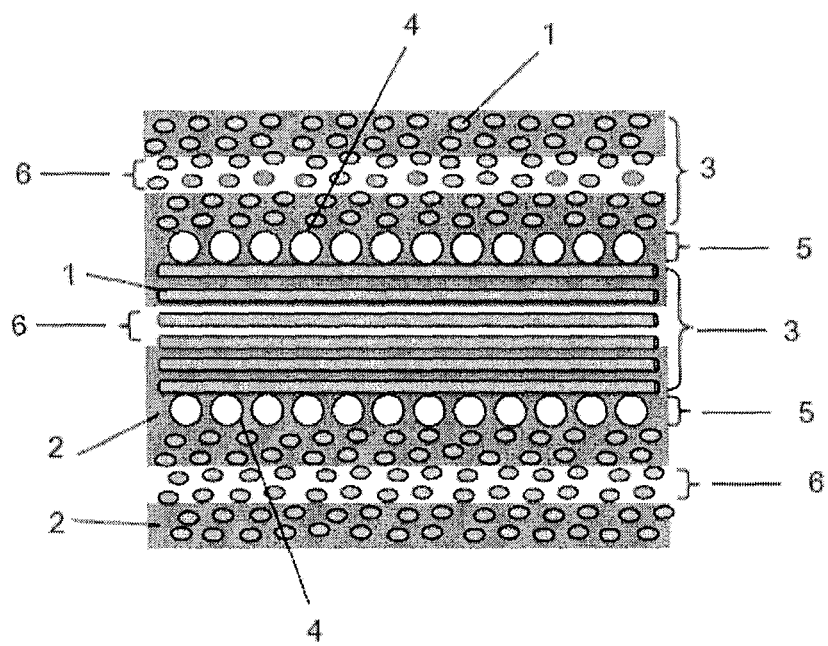
FIG. 1 shows an example of a cross-section view of a typical prepreg of the present invention.

The terms "approximately", "about" and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 15° C. to 43° C.

Embodiments of the present disclosure contain prepregs that have a controlled cure to create a low void composite after curing in a vacuum bag only process while maintaining a high Tg and reduce the process time from that of current OOA systems. Current OOA systems are designed to create a low void FRC but cannot cure quickly at lower temperatures and thus substantially increase the processing time of the prepreg. These lower temperature cures are needed to allow the resin to cure to certain percentage so that the volatiles in the resin do not disassociate from the resin system at the final cure temperature thus reducing the final void content of the FRC. Another advantage to the lower temperature cures is the use of low cost tooling that can significantly reduce the cost of each part produced.

The embodiments of the present disclosure have been designed to cure at a rate that allows for full consolidation and then cure quickly after the consolidation is complete, thus reducing the processing time to create low void FRC from an OOA process. If the cure rate is not controlled to allow for full consolidation of the matrix resin then void content will be high do to incomplete wetting of the fibers in the prepreg before the cure is advanced too far. Also attempts to adjust the cure rate can adversely affect certain properties such as the Tg. The prepregs for the present disclosure can be designed to cure at the rate needed without affecting the Tg.

A cure rate for the thermosetting resin of the present embodiment is designed by finding the consolidation time with the following method:

Herein, prepreg refers to a molding intermediate substrate where reinforcing fibers are impregnated with a matrix resin comprising a thermosetting resin composition and particles or fibers of thermoplastic resin. With this prepreg, the thermosetting resin is in an uncured condition, and a fiber reinforced composite material can be obtained by laying up a single or plurality of layers of the prepreg and curing the prepreg under elevated temperature using both autoclave or vacuum bag only processing. With a fiber reinforced composite material made by laying up a plurality of prepreg layers and curing, the surface part of the prepreg becomes an interlayer formed layer of the fiber reinforced composite material, and the inside of the prepreg becomes a reinforcing fiber layer of the fiber reinforced composite material.

The reinforcing fibers that are used in the present invention are comprised of glass fibers, aramid fibers, carbon fibers, graphite fibers, or boron fibers or the like. Examples of the shape and orientation of the reinforcing fibers include long fibers aligned in one direction, bidirectional fabrics, multiaxial fabrics, nonwoven materials, mats, knits, braids, and the like. These can be freely selected based on the application and area of use.

The thermosetting resin that is used in the present invention is not particularly restricted, so long as the resin undergoes a cross-linking reaction due to heat and forms at least a partial three-dimensional cross linked structure. Examples of these thermosetting resins include unsaturated polyester resin, vinyl ester resin, epoxy resin, benzoxazine resin, phenol resin, urea resin, melamine resin, and polyimide resin and the like. Variance of these resins and resins that are blends of two or more types can also be used. Furthermore, these thermosetting resins can be resins that are self curing under heat, or can be blended with a curing agent or curing accelerator or the like. Of these thermosetting resins epoxy is used in the examples of this specification.

For the present invention, particles or fibers of thermoplastic resins are an essential component to achieve excellent impact resistance. The material of the particles or fibers that is used in the present invention can be similar to the various types of thermoplastic resins previously presented as the thermoplastic resin that is blended and dissolved in the thermosetting resin. Of these, polyamides are most preferable for greatly increasing the impact resistance because of excellent toughness. The thermoplastic resins that have particularly favorable adhesion strength to the thermosetting resin increase the interlayer peel strength of the fiber reinforced composite material thus enhancing the effect on impact resistance of the fiber reinforced composite.

If particles of thermoplastic resin are used, the shape of the thermoplastic resin particles can be spherical, non-spherical, porous, needle shaped, whisker shaped, or flake shaped.

If thermoplastic resin fibers are used, the shape of the thermoplastic resin fibers can be short fibers or long fibers. For the case of short fibers, a method of using fibers in the same manner as particles as shown in JP02-69566A, or a method of processing in a mat is possible. For the case of long fibers, a method of orienting the long fibers horizontally on the surface of the prepreg as shown in JP04-292634A, or a method of randomly orienting the fibers as shown in WO94016003A can be used. Furthermore, the fibers can be processed and used as a sheet type substrate such as a weave as shown in JP02-32843A, or as a nonwoven material or knit as shown in WO94016003A. Furthermore, a method can be used where short fiber chips, chopped strands, milled fibers, and short fibers are spun as thread and then horizontally or randomly oriented to form a weave or knit.

The particles or fibers of thermoplastic resin are locally provided on the surface part of the prepreg. In other words, a layer with an abundance of the aforementioned particles or fibers, where the particles or fibers can clearly be confirmed to exist locally when the cross section is observed (hereinafter also referred to as an interlayer molding layer) must be formed on the surface portion of the prepreg. Thereby, if the prepreg is overlaid and the matrix resin is cured to form a fiber reinforced composite material, an interlayer is formed where the aforementioned particles or fibers of the matrix resin exists locally between the reinforcing fiber layers. Thereby the toughness between the reinforcing fiber layers will have been increased, and a high degree of impact resistance will be expressed by the fiber reinforced composite material obtained.

The impregnation ratio for several embodiments of the thermosetting resin composition in the prepreg is between 10 and 90% and in another embodiment between 20 and 70%. Optimal impregnation is dependent upon fiber composition, fiber areal weight, and fiber arrangement. Fiber arrangements may be a unidirectionally aligned array, woven fabrics, or others. For woven fabrics, the type of weave will influence optimal impregnation. FIG. 1 shows an example of a cross-section view of a typical prepreg of the present invention. The present invention will be described more specifically using FIG. 1.

The prepreg of the present invention illustrated in FIG. 1 has an interlayer molded layer 5 containing thermosetting resin 2 and thermoplastic resin particles 4 between two reinforcing fiber layers 3 containing reinforcing fiber 1 and thermosetting resin 2. The toughness between the reinforcing fiber layers is enhanced by the formation of the interlayer molded layer 5. Furthermore, the prepreg of the present invention has an unimpregnated layer 6 where the reinforcing fibers 1 are not impregnated with the thermosetting resins 2. The unimpregnated layer 6 acts as an air path during out of autoclave molding and releases the volatile components from the epoxy resin and the air that was trapped during the layup process to the outside of the panel. The unimpregnated layer 6 can be a contiguous reinforcing fiber layer, or can be a non-contiguous reinforcing fiber layer that is impregnated in spots with the thermosetting resin. Furthermore, with a conventional completely impregnated prepreg, the weight fraction of the thermosetting resin 1 included in the interlayer molded layer 5 is low, so the flow of matrix resin in the interlayer molded layer 5 will be extremely low. On the other hand, with the prepreg of the present invention, the weight fraction of the thermosetting resin in the interlayer molded layer 5 is optimized by controlling the impregnation ratio to a high degree, and air that is trapped during layup and volatile components from the prepreg are released out of the prepreg using the flow of the matrix resin while at the same time resin flow to the unimpregnated layer 6 in the prepreg is ensured and thus the matrix resin can quickly impregnate unimpregnated layer 6.

Consolidation (Ti) Definition

Figure 2:
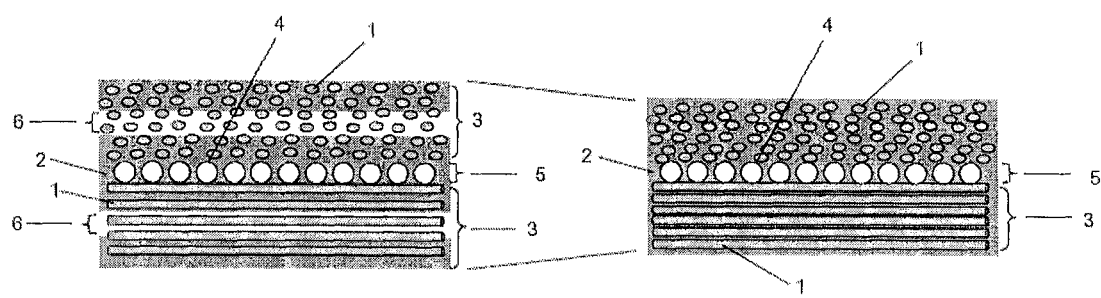
FIG. 2 is a schematic of the consolidation process for the prepreg of one embodiment.

Next, the consolidation process for the prepreg of one embodiment using unidirectional fibers having a resin content of 30-37% by weight and other embodiments using fabric type architecture with resin content from 35-46% of the present invention are described using FIG. 2. The prepreg of the present invention has an unimpregnated layer 6. With this prepreg, the thermosetting resin 2 impregnates the unimpregnated layer 6 during curing. At the same time, the density of the prepreg is increased while the top and bottom of the prepreg are firmly integrated. In the present invention, this series of processes is defined as the consolidation process and the time for this process to complete is called the consolidation time and will be defined as $t_i$. In order to achieve low voids in the fiber reinforced composite material obtained, the aforementioned consolidation process must be completed before the thermosetting resin reaches a cure point at which the flow of the resin stops. The interlayer molded layer with an abundance of the aforementioned particles or fibers will have extremely low weight fraction of the thermosetting resin, so the resin flow will be much lower when compared to the aforementioned thermosetting resin alone and therefore there will be an increased consolidation time when out of autoclave molding in particular is used. This makes knowing the time for consolidation important so that the cure rate can be designed to cure at a rate that allows for full consolidation before a certain cure percent is reached. Herein is describes the process for determining the consolidation time for a prepreg system:

Layup five panels with 12 plies of the prepreg in each panel, and consolidate all panels under vacuum compaction for 1 minute. Place each panel on a separate caul plate and vacuum bag each panel. Hold each panel under vacuum for one hour and then place four of the five caul plates into the oven under full vacuum and start the cure with a standard ramp of 1.7° C. per minute to a temperature of 120° C. Pull each panel out at a predetermined amount of cure, for example 10%, 20%, 50% and fully cured. The fully cured panel will go through a complete cure cycle that will include the ramp to the first dwell, then dwell at the first dwell temperature, the time at the first dwell temperature is determined by finding the time for the resin to reach a cure percent of approximately 20%, once the resin reaches a 20% cure the temperature is ramped at a rate of 1.7° C. per minute to a temperature of 177° C. for 2 hrs to complete the cure of the FRP. Once panels have been pulled out of the oven allow them to fully cool to room temperature before removing from the vacuum bag. Once each panel has been removed from the vacuum bag, including the one that did not go in the oven, inspect each panel with ultrasonic nondestructive inspection (NDI) against a control panel known not to have any voids and is fully cured. Panels having less than a 30% attenuation loss from the control panel are considered fully consolidated. If all panels show full consolidation the steps can be repeated for shorter times and lower cure percentages to find the shortest consolidation time. If any of the panels show an increase in attenuation loss during the cure the dwell temperature is higher than the temperature needed to disassociate the volatiles from the matrix resin system. As would be known to those skilled in the art the experiment can be repeated at different temperatures to simulate different cure times and different viscosities which will increase or decrease the consolidation time. Typically the higher the dwell temperature the lower the viscosity will be and the faster the consolidation time.

Once the consolidation time (ti) has been determined the cure time of the thermosetting resin can be adjusted so that the time to reach 20% cure is after full consolidation ti. 20% cure is determined to be the point at which resin flow is reduced such that consolidation is essentially stopped. Also if the resin is at 20% cure it will reach a higher state of cure before it reaches the final dwell temperature thus reducing the amount of volatiles that are released. The reduced amount of volatiles reduces the total amount of porosity left in the fiber reinforced composite after the full cure is complete.

The percent cure is determined using a TA Instruments differential scanning calorimeter (DSC). Initially the cure temperature is determined by finding the gel time using the ASTM D3532/R2004 method at 120° C. Once the gel time is determined several samples of the resin can be placed in the oven and cured for the gel time and predetermined times after the gel time. Each of these samples can then be checked on the DSC for percent cure. Only a close approximation of 20% cure is needed and it is preferable to meet or exceed the 20% cure time.

The reaction rate of the thermosetting resin can be adjusted by increasing or decreasing the amount of hardener in the resin. Another method for adjusting the cure rate is to add a catalyst. The catalyst is a chemical that is not consumed during the cure and only helps to promote the cure. The catalysts are employed in any quantity which will promote the reaction such that the reaction rate meets the criteria set in the above definitions.

Suitable catalysts are any catalyst that can promote the reaction rate such that it allows for full consolidation of the material. Particularly suitable catalysts are those that do not affect the Tg of the thermosetting resin after cure. Other catalyst can be used to promote the cure but affect the cured Tg of the thermosetting resin. These catalysts usually increase the reaction rate more and can be used on lower temperature cured thermosetting resin systems. The quantity of catalyst used varies depending on how much each catalyst promotes the reaction rate of the thermosetting resin.

Suitable catalysts used to promote several embodiments of the thermosetting resin system are those wherein the catalyst comprises a phenol, sulfonic ester, sulfonic acid, pyrocatechol, tosyl, and/or urea group.

The viscosity at 50° C. of the thermosetting resin of various embodiments can be between 100 and 10000 Pa·s, in some embodiments it is between 200 and 9000 Pa·s, in still other embodiments between 300 and 8000 Pa·s, in order to achieve good prepreg handling properties such as tack and drapability.

The minimum viscosity of the thermosetting resin for several embodiments of the present invention can be between 0.1 and 200 Pa·s, other embodiments between 0.3 and 100 Pa·s. If the minimum viscosity is too low, the flow of the matrix resin will be too high allowing the voids to move together creating larger voids. If the minimum viscosity is too high the resin will not flow fast enough and consolidation will be to slow for production purposes. Herein, 50° C. and the minimum viscosity are determined by using a dynamic viscoelasticity measuring device (ARES, manufactured by TA Instruments).

The prepreg of the present invention can be manufactured by applying the thermosetting resin composition of the present invention onto a release paper using a reverse roller coater or a knife coater or the like to form a resin film, and then impregnating the thermosetting resin composition film on both sides of the reinforcing fibers by laying up, heating, and compressing. Furthermore, a prepreg that is completely covered with matrix resin only on one side can be manufactured by laying up the thermosetting resin composition film on only one side of the reinforcing fibers and then heating and compressing to impregnate. This prepreg contains reinforcing fibers where one side is not impregnated with matrix resin, and therefore this side can act as an air path, so there is an effect of reducing voids in the fiber reinforced composite material obtained. Herein, a partially impregnated prepreg can be manufactured by adjusting the conditions during impregnation such as by reducing temperature, pressure, and time, such that a portion of the reinforcing fibers are not impregnated with thermosetting resin composition. Alternatively, as shown in JP14-249605A, the partially impregnated prepreg can also be manufactured using a film where the thermosetting resin composition coated on the release paper has a shape that does not completely cover the release paper, such as a striped pattern. The amount of reinforcing fibers per unit area of the prepreg is between 70 and 400 g/m$^2$.

The fiber reinforced composite material of the present invention can be manufactured by laying up and thermal curing the aforementioned prepreg. Naturally, a fiber reinforced composite material can also be obtained by curing a single layer prepreg. Heating is performed by a device such as an oven, autoclave, or press or the like. From the perspective of low cost, an oven is alternatively used. If the prepreg of the present invention is heated and cured in an oven a molding method is used where a single layer of prepreg or a laminate body formed by laying up a plurality of layers is formed, and the laminate body obtained is bagged and degassed at a temperature between 20 and 50° C. where the degree of vacuum inside the bag is 11 kPa or less, and the temperature is raised to the intermediate dwell temperature while maintaining the degree of vacuum at 11 kPa or less. If the degree of vacuum is higher than 11 kPa, the flow of matrix resin in the prepreg will be insufficient, and the unimpregnated reinforcing fibers cannot be impregnated with the matrix resin during prepreg curing, so many voids might occur in the fiber reinforced composite material obtained. Herein, degassing is performed at conditions where the degree of vacuum is between 0.1 kPa and 11 kPa, alternatively between 0.1 kPa and 7 kPa. Herein, the intermediate dwell temperature for various embodiments of the present invention may be between 80 and 200° C., and in some embodiments between 88 and 180° C. If the intermediate dwell temperature is too low the consolidation time for some embodiments may be too long, which may lead to high costs, but if the curing temperature is too high for some embodiments, voids may be created from the volatiles in the resin system. The final cure temperature of various embodiments of the present invention may be between 100 and 200° C. in some embodiments, between 120 and 180° C. The intermediate dwell temperature is determined by the processing needs of the user and the matrix resin used. The final cure temperature is determined by the particular thermosetting resin used.

When raising the temperature from room temperature to the curing temperature, the temperature can be raised at a constant rate up to the curing temperature, or the temperature can be maintained at an intermediate dwell temperature for a fixed period of time and then increased to the curing temperature. In this manner, a curing method where an intermediate temperature is maintained for a fixed period of time and then the temperature is increased to the curing temperature is referred to as step curing, and during step curing, the temperature that is maintained for a fixed period of time. Maintaining an intermediate temperature for a fixed period of time in this manner ensures prepreg consolidation due to sufficient flow of the matrix resin and ensures volatile components from the prepreg do not disassociate from the matrix resin system.

The present invention is described below in further detail using working examples. The following materials were used to obtain the prepreg for each working example.

Carbon Fibers

Torayca (registered trademark) T800S-24K-10E (carbon fibers manufactured by Toray K.K. with a fiber filament count of 24,000, tensile strength of 5.9 GPa, tensile elasticity of 290 GPa, and tensile elongation of 2.0%)

Epoxy Resin

Bisphenol A type epoxy resin, Araldite (registered trademark) LY1556 (manufactured by Huntsman Advanced Materials)

Bisphenol A type epoxy resin, Epon (registered trademark) 825 (manufactured by Momentive Specialty Chemicals)

Tetraglycidyldiaminodiphenylmethane, Araldite (registered trademark) MY9655 (EEW; 126 g/eq, manufactured by Huntsman Advanced Materials)

Thermoplastic Resin

Polyethersulfone with a terminal hydroxyl group, Sumika Excel (registered trademark) PES5003P (manufactured by Sumitomo Chemical K.K.)

Hardener 4,4'-diaminodiphenylsulfone, Aradur (registered trademark) 9664-1 (manufactured by Huntsman Advanced Materials)

Accelerator

DCMU (3-(3,4-dichlorophenyl)-1,1-dimethylurea) (manufactured Sigma Aldrich Chemical Company)

Ethyl par-toluenesulfonate (manufactured by Sigma Aldrich Chemical Company) 98%

4-tert-butylcatechol (manufactured by Sigma Aldrich Chemical Company) 97%

Butylated hydroxyl anisole (manufactured by Sigma Aldrich Chemical Company)

SAN-AID SI-150 (manufactured by Sanshin Chemical Ind. Co., LTD.

Thermoplastic Resin Particles

TN fine particles (manufactured by Toray Industries Inc.)

The following measurement methods were used to measure the thermosetting resin composition and the prepreg for each working example.

(1) Thermosetting Resin Viscosity Measurement

The thermosetting resin was measured using a dynamic viscoelasticity measuring device (ARES, manufactured by TA Instruments) using parallel plates while simply increasing the temperature at a rate of 2° C./min, with a strain of 100%, frequency of 0.5 Hz, and plate interval of 1 mm, from 50° C. to 170° C.

(2) Thermosetting Resin Percent Cure Measurement

The percent cure of the thermosetting resin was determined using a differential scanning calorimeter (DSC) (Q2000 with a RCS (mechanical refrigeration cooling system), manufactured by TA Instruments) using a ramp rate of 10° C./min for the ramp rate. The percent cure is determined by comparing the exothermic reaction peak of uncured resin against the exothermic reaction peak of a cured resin. Herein, the degree of curing of the thermosetting resin composition is determined by measuring the calorific power of curing ($H_0$) of the thermosetting resin composition immediately after preparing the resin and the residual calorific power of the cured resin composition ($H_1$) using a differential scanning calorimeter (DSC, manufactured by TI Instruments), and then calculating by the equation:

DSC degree of curing (%)=$[(H_0-H_1)\times 100/H_0]$ (3) Flow and Gelling Time of Thermosetting Resin Composition The gelling time of the matrix resin was determined using ASTM D3532/R2004 or JIS K-7071 "Test Method of Prepreg Made of Carbon Fiber and Epoxy Resin (4) Measurement of Impregnation Ratio of Thermosetting Resin Composition in Prepreg The prepreg was sandwiched between two surfaces of smooth polytetrafluoroethylene resin plates and gradually cured at 40° C. for 10 days to produce plate-like cured prepreg. After curing, a cut was made from a direction orthogonal to the adhesive surface, a photograph was taken of the cross-section using an optical microscope at a zoom of 50× or higher such that the top and bottom surfaces of the prepreg fit within the viewing field. The surface area ratio of the resin impregnated part with regards to the cross-sectional area was calculated and used as the impregnation ratio of the thermosetting resin composition in the prepreg.

(5) Fiber Reinforced Composite Material Void Ratio Measurement 16 plies of unidirectional prepreg in a [0°] structure and degassed at 25° C. and a degree of vacuum of 3 kPa, and then the degree of vacuum was maintained at 3 kPa while the temperature was increased at a rate of 1.5° C./min to a temperature of 120° C. and maintained for 180 minutes, and then increased at a rate of 1.5° C./min to a temperature of 180° C. and maintained for 120 minutes to cure the prepreg and produce a laminate body 300 mm long and 150 mm wide. Three 10 mm long×10 mm wide sample pieces were cut from this laminate body, and the cross-section was polished, and then three photographs were taken of each piece for a total of nine photographs using an optical microscope at a zoom of 50× or higher such that the top and bottom surfaces of the laminate body fit within the viewing field. The surface area ratio of voids with regards to the cross-sectional area was calculated and the average void ratio of the 9 points was used as the void ratio.

Working Examples 1-7

A mixture was created by dissolving 13 weight parts of PES5003P into 60 weight parts of Araldite (registered trademark) MY9655 and 20 weight parts of Epon (registered trademark) 825 in a mixer, 20 weight parts of the TN (registered trademark) thermoplastic resin particles were charged into the mixture and dispersed uniformly, and then 45 weight parts of Aradur (registered trademark) 9664-1 was mixed into the mixture as a hardener to produce a thermosetting resin composition. Accelerators were added to the mixture in various amounts according to table 1.

The produced thermosetting resin composition was applied onto release paper using a knife coater to produce two sheets of 52.0 g/m² resin film. Next, the aforementioned 2 sheets of fabricated resin film were overlaid on both sides of unidirectionally oriented carbon fibers with a density of 1.8 g/cm² in the form of a sheet (T800S-12K-10E) and the resin was impregnated using a roller temperature of 100° C. and a roller pressure of 0.07 MPa to produce a unidirectional prepreg with a carbon fiber area weight of 190 g/m² and a matrix resin weight fraction of 35.4%, This unidirectional prepreg has an impregnation level from about 10-70%.

A FRC was fabricated by laying up 12 plies of the aforementioned prepreg was fabricated using a vacuum bag only process as defined below by placing it into a vacuum envelope and degassed for one hour at ambient temperature with a degree of vacuum of 3 Kpa. After degassing was complete the prepreg was brought from ambient temperature to 120° C. at a rate of 1.7° C./min and held at 120° C. for 60 minutes. The time to reach full consolidation $t_f$, and the time to reach 20% cure $T_{20}$ of the thermosetting resin composition and the prepreg was measured and stated in Table 1. The viscosity was also measured for the thermosetting resin and viscosity at 50° C. and minimum viscosity are reported in Table 1. The void ratio of the thermosetting resin in the FRC was measured after a final cure was performed at 176° C. for 120 minutes. The results are stated in Table 1.

Comparative Example 1

Prepregs were fabricated in a manner similar to Working Example 1 except that accelerators were not used. A FRC was fabricated by laying up 12 plies of the aforementioned prepreg and placed into a vacuum envelope and degassed for one hour at ambient temperature with a degree of vacuum of 3 Kpa. After degassing was complete the prepreg was brought from ambient temperature to 120° C. at a rate of 1.7° C./min and held at 120° C. for 60 minutes. The time to reach full consolidation and the time to reach 20% cure $T_{20}$ of the thermosetting resin composition and the prepreg was measured and stated in Table 1. The viscosity was also measured for the thermosetting resin and viscosity at 50° C. and minimum viscosity are reported in Table 1. The void ratio of the thermosetting resin in the FRC was measured after a final cure was performed at 176° C. for 120 minutes. The results are stated in Table 1.

Comparative Examples 2-7

Prepregs were fabricated in a manner similar to Working Example 1. A FRC was fabricated by laying up 12 plies of the aforementioned prepreg and placed into a vacuum envelope and degassed for one hour at ambient temperature with a degree of vacuum of 3 Kpa. After degassing was complete the prepreg was brought from ambient temperature to 120° C. at a rate of 1.7° C./min and held at 120° C. for 60 minutes. The time to reach full consolidation $t_f$, and the time to reach 20% cure $T_{20}$ of the thermosetting resin composition and the prepreg was measured and stated in Table 1. The viscosity was also measured for the thermosetting resin and viscosity at 50° C. and minimum viscosity are reported in Table 1. The void ratio of the thermosetting resin in the FRC was measured after a final cure was performed at 176° C. for 120 minutes. The results are stated in Table 1.

Examples 10-11, Impregnation Level

Prepregs manufactured in a manner similar to working example 2, except that the roller temperature of working example 10 was 60° C., the roller temperature of working example 11 was 120° C. and the roller pressure was 0.14 MPa.

Working Example 12-13, Different Areal Weights

Prepregs were manufactured in a manner similar to working example 2, except that the areal weight of the resin film of working example 12 was 44.7 g/m² and the roller pressure was 0.1 MPa, the area weight of the resin film was 58.22 g/m² in example 13 and the roller temperature was 120° C. The prepregs were cured similar to working example 2 and the results stated in Table 1.

Example 14, Two-Sided Fabric Prepreg T800H-6K-403

The produced thermosetting resin composition prepared in working example 2 was applied onto release paper using a knife coater to produce one sheet of 68.8 g/m² resin film. Next, the aforementioned sheet of fabricated resin film was overlaid on one side of a plain weave fabric made from T800H-6K-40B, and the resin was impregnated using a roller temperature of 120° C. and a roller pressure of 0.1 MPa to produce a unidirectional prepreg with a carbon fiber area weight of 190 g/m² and a matrix resin weight fraction of 42%. The epoxy resin composition content in the prepreg was measured using the plain weave fabric prepreg that was produced, and the result was 42%. The compressive strength measurement after impact and the void ratio of the fiber reinforced composite material were measured and the results were 286 MPa and 0.5% respectively.

Predictive Working Example 1, One-Sided Prepreg Fabric

Produce the thermosetting resin composition prepared in working example 2 and apply onto release paper using a knife coater to produce one sheet of 137 g/m² resin film. Next, the aforementioned sheet of fabricated resin film is overlaid onto one side of a plain weave fabric made from T800H-6K-40B, and the resin is impregnated using a roller temperature of 120° C. and a roller pressure of 0.1 MPa to produce a unidirectional prepreg with a carbon fiber area weight of 190 g/m² and a matrix resin weight fraction of 42%. The epoxy resin composition content in the prepreg was measured using the plain weave fabric prepreg that is produced, and the result is 42%.

Predictive Example 2, Two-Sided Fabric Prepreg T700S-12K

Produce the thermosetting resin composition prepared in working example 2 apply onto release paper using a knife coater to produce one sheet of 68.8 g/m² resin film. Next, the aforementioned sheet of fabricated resin film is overlaid on two sides of a plain weave fabric made from T700S-12K, and the resin is impregnated using a roller temperature of 120° C. and a roller pressure of 0.1 MPa to produce a unidirectional prepreg with a carbon fiber area weight of 190 g/m² and a matrix resin weight fraction of 42%. The epoxy resin composition content in the prepreg is measured using the plain weave fabric prepreg that was produced.

TABLE 1

| | | | Working Examples | | | | | |
| --- | --- | --- | --- | --- | --- | --- | --- | --- |
| ITEM | | UNIT | 1 | 2 | 3 | 4 | 5 | 6 |
| Epoxy Resin | MY9655T/ELM434 | Weight Parts | 60 | 60 | 60 | 60 | 60 | 60 |
| | Epon 825 | Weight Parts | 20 | 20 | 20 | 20 | 20 | 20 |
| | Epiclon 830 | Weight Parts | 20 | 20 | 20 | 20 | 20 | 20 |
| Thermoplastic particle | TN | Weight Parts | 20 | 20 | 20 | 20 | 20 | 20 |
| Hardener | 4,4'-DDS | Weight Parts | 45 | 45 | 45 | 45 | 45 | 45 |

TABLE 1-continued

| | | | | | | | | |
|---|---|---|---|---|---|---|---|---|
| Thermoplastic Resin | Sumika Excel 5003P | Weight Parts | 13 | 13 | 13 | 13 | 13 | 13 |
| Accelerator | DCMU | Weight Parts | | | | | | |
| | ethyl para-toluenesulfonate 98% | Weight Parts | | 1 | 1.5 | 2 | | |
| | 4-tert-butylcatechol 97% | Weight Parts | 5 | | | | | |
| | SI-150 | Weight Parts | | | | | 2 | 3 |
| | butylated hydroxy Anisole | Weight Parts | | | | | | |
| Gelling time | | minutes | 179.40 | 187.15 | 176.00 | 145.91 | 175.98 | 140.80 |
| $t_{20}$ | | minutes | 205.00 | 200.00 | 151.00 | 155.00 | 201.00 | 161.98 |
| $t_i$ | | minutes | 130.00 | 130.00 | 130.00 | 130.00 | 130.00 | 130.00 |
| Tg of cured prepreg | | °C. | 199.00 | 208.00 | 208.00 | 208.00 | 202.00 | 203.00 |
| Void Ratio | | % | 0.50 | 0.40 | 0.60 | 0.80 | 0.70 | 0.60 |

| | | Comparative Examples | | | | | | |
|---|---|---|---|---|---|---|---|---|
| | ITEM | 1 | 2 | 3 | 4 | 5 | 6 | 7 |
| Epoxy Resin | MY9655T/ELM434 | 60 | 60 | 60 | 60 | 60 | 60 | 60 |
| | Epon 825 | 20 | 20 | 20 | 20 | 20 | 20 | 20 |
| | Epiclon 830 | 20 | 20 | 20 | 20 | 20 | 20 | 20 |
| Thermoplastic particle | TN | 20 | 20 | 20 | 20 | 20 | 20 | 20 |
| Hardener | 4,4'-DDS | 45 | 45 | 45 | 45 | 45 | 45 | 45 |
| Thermoplastic Resin | Sumika Excel 5003P | 13 | 13 | 13 | 13 | 13 | 13 | 13 |
| Accelerator | DCMU | | | | | | 3 | 5 |
| | ethyl para-toluenesulfonate 98% | | | | | 5 | | |
| | 4-tert-butylcatechol 97% | | | | 3 | | | |
| | SI-150 | | | | | | | |
| | butylated hydroxy Anisole | | 3 | 5 | | | | |
| Gelling time | | 211.00 | 255.05 | 248.55 | 216.10 | 63.89 | 59.91 | 56.80 |
| $t_{20}$ | | 300.00 | 275.00 | 260.00 | 230.00 | 67.00 | 60.00 | 58.00 |
| $t_i$ | | 130.00 | 130.00 | 130.00 | 130.00 | 130.00 | 130.00 | 130.00 |
| Tg of cured prepreg | | 204.00 | 198.00 | 197.00 | 201.00 | 207.00 | 138.00 | 135.00 |
| Void Ratio | | 3.40 | 2.70 | 2.30 | 1.80 | 2.10 | 2.80 | 3.80 |

The invention claimed is:

1. A method of processing a prepreg comprising a thermosetting resin, the method comprising:
    determining the consolidation time by curing the prepreg in an oven under a vacuum bag, and
    determining an attenuation loss of the prepreg, and recording a time when the attenuation loss reaches 30%, and determining a time at which a percent cure of the thermosetting resin reaches 20%, wherein when the prepreg is cured under a vacuum bag only condition, the prepreg satisfies the following condition (1) and (2):

$$100 < t_i < 350 \quad (1)$$

$$t_i < t_{20} < 350 \quad (2)$$

wherein, the thermosetting resin comprises an accelerator for reducing $t_{20}$ while maintaining the time for consolidation $t_i$, wherein, $t_i = t_1 + t_2$ (in minutes), wherein $t_1$ is time (in minutes) from 20° C. to an initial dwell temperature of 120° C. and $t_2$ is time (in minutes) at 120° C. until the prepreg reaches 30% attenuation which is determined using an ultrasonic nondestructive inspection (NDI), $t_{20} = t_1 + t_3$ (in minutes), wherein $t_1$ is time (in minutes) from 20° C. to an initial dwell temperature of 120° C. and $t_3$ is time (in minutes) at 120° C. until the prepreg reaches a cure degree of 20%, which is determined using differential scanning calorimeter (DSC), wherein the thermosetting resin comprises an accelerator for reducing $t_{20}$ while maintaining the time for consolidation $t_i$ about the same.

2. The method according to claim 1, wherein the method satisfies the following conditions (1) and (2):

$$100 < t_i < 350 \quad (1)$$

$$100 < t_{20} < 150 \quad (2).$$

* * * * *